(12) United States Patent
Slinkard

(10) Patent No.: US 10,645,909 B1
(45) Date of Patent: May 12, 2020

(54) POULTRY DRINKER

(71) Applicant: Manna Pro Products, LLC, Chesterfield, MO (US)

(72) Inventor: Paul H. Slinkard, Nolensville, TN (US)

(73) Assignee: MANNA PRO PRODUCTS, LLC, Chesterfield, MO (US)

( * ) Notice: Subject to any disclaimer, the term of this patent is extended or adjusted under 35 U.S.C. 154(b) by 530 days.

(21) Appl. No.: 15/163,941

(22) Filed: May 25, 2016

(51) Int. Cl.
*A01K 39/02* (2006.01)
*A01K 7/06* (2006.01)

(52) U.S. Cl.
CPC ............ *A01K 39/0213* (2013.01); *A01K 7/06* (2013.01); *A01K 39/02* (2013.01)

(58) Field of Classification Search
CPC .... A01K 39/0213; A01K 39/02; A01K 39/04; A01K 39/00; A01K 7/06; A01K 7/00; A01K 5/0107; A01K 5/0233
See application file for complete search history.

(56) References Cited

U.S. PATENT DOCUMENTS

| | | | | |
|---|---|---|---|---|
| 1,046,938 A | * | 12/1912 | Bacon ................. | A01K 5/0233 119/70 |
| 3,515,098 A | * | 6/1970 | Thurmond ........... | A01K 5/0233 119/51.01 |
| 3,529,575 A | * | 9/1970 | Schalk ................. | A01K 1/0356 119/475 |
| 5,099,798 A | * | 3/1992 | Ohara .................. | A01K 39/024 119/72.5 |
| 5,797,571 A | * | 8/1998 | Brophy ................ | E06C 7/14 182/129 |
| 6,817,314 B1 | * | 11/2004 | Conte .................. | A01K 7/06 119/72 |
| 6,843,205 B1 | * | 1/2005 | Segreto ............... | A01K 5/0114 119/515 |
| 2006/0180618 A1 | * | 8/2006 | MacNaughton ..... | A45F 5/02 224/148.7 |
| 2007/0272814 A1 | * | 11/2007 | Bardill ................ | F16B 45/00 248/305 |
| 2009/0205575 A1 | * | 8/2009 | Rodriguez ........... | A01K 7/06 119/72.5 |
| 2014/0158059 A1 | * | 6/2014 | Hasbrouck .......... | A01K 39/0213 119/73 |

FOREIGN PATENT DOCUMENTS

DE 102016106938 A1 * 10/2017 ............... A01K 7/00

* cited by examiner

*Primary Examiner* — Jessica B Wong
(74) *Attorney, Agent, or Firm* — Armstrong Teasdale LLP

(57) ABSTRACT

An enclosed container for holding water and at least one hole near a bottom of the container with a valve for an animal to obtain water from the container. At least one leg underneath the container is provided for supporting the bottom of the container and the valve off of the ground. The enclosed container is tapered from a top of the container to the bottom of the container. A hanger assembly attaches to opposite sides near a top of the container, so that when the animal drinker is hung, the container rotates so that the front of the container rests substantially flush against a fence.

19 Claims, 10 Drawing Sheets

POULTRY DRINKER

This invention relates in general to a container having animal-actuable valve for supplying a water to a small animal and, more particularly, to a type thereof which can be easily refilled and set on the ground without getting the valve dirty.

BACKGROUND

Animal-actuated valve devices connected to a source of water for supplying such water to animals are well known and widely used. The animal-actuated or drinking valves are connected to the water supply by pipes which are part of a substantially permanent installation. Accordingly, the cages for the animals must be located in substantially precise positions relative to the water supply system, which is not always desirable. In other designs, the containers for storing the water are irregularly shaped so that they cannot easily be set on the ground without tipping over. Another deficiency in these designs is that the valve is set on the ground in the dirt or animal excrement. This is not sanitary and can lead to illnesses.

SUMMARY

An animal drinker is disclosed. The animal drinker comprises of an enclosed container for holding water with an opening at a top of the container for filling the container with the water and at least one hole near a bottom of the container. At least one valve is positioned in the at least one hole for an animal to obtain water from the container. At least one leg underneath the container is provided for supporting the bottom of the container and the valve off of the ground. The valve can be positioned in the bottom, underneath the container for the animal to drink from the bottom of the container, or the valve can be positioned on a side of the container above the bottom of the container for the animal to drink from the side of the container.

The enclosed container is tapered from a top of the container to the bottom of the container with a dimension of the top of the container is larger than a dimension of the bottom of the container. A hanger assembly comprising a cross arm that attaches to opposite sides near a top of the container and a hook that is attached near a midpoint of the cross arm are provided, so that when the animal drinker is hung, the container rotates around a first axis extending between the cross arm so that a front side between the opposite sides of the container rests substantially flush against an object, such as a fence.

The hanger assembly further comprises a rotatable connector comprising a bottom portion combined to the cross arm and a top portion combined to the hook. The bottom portion rotates with respect to the top portion around a second axis that is perpendicular to the first axis.

DETAILED DESCRIPTION

Figure 1:
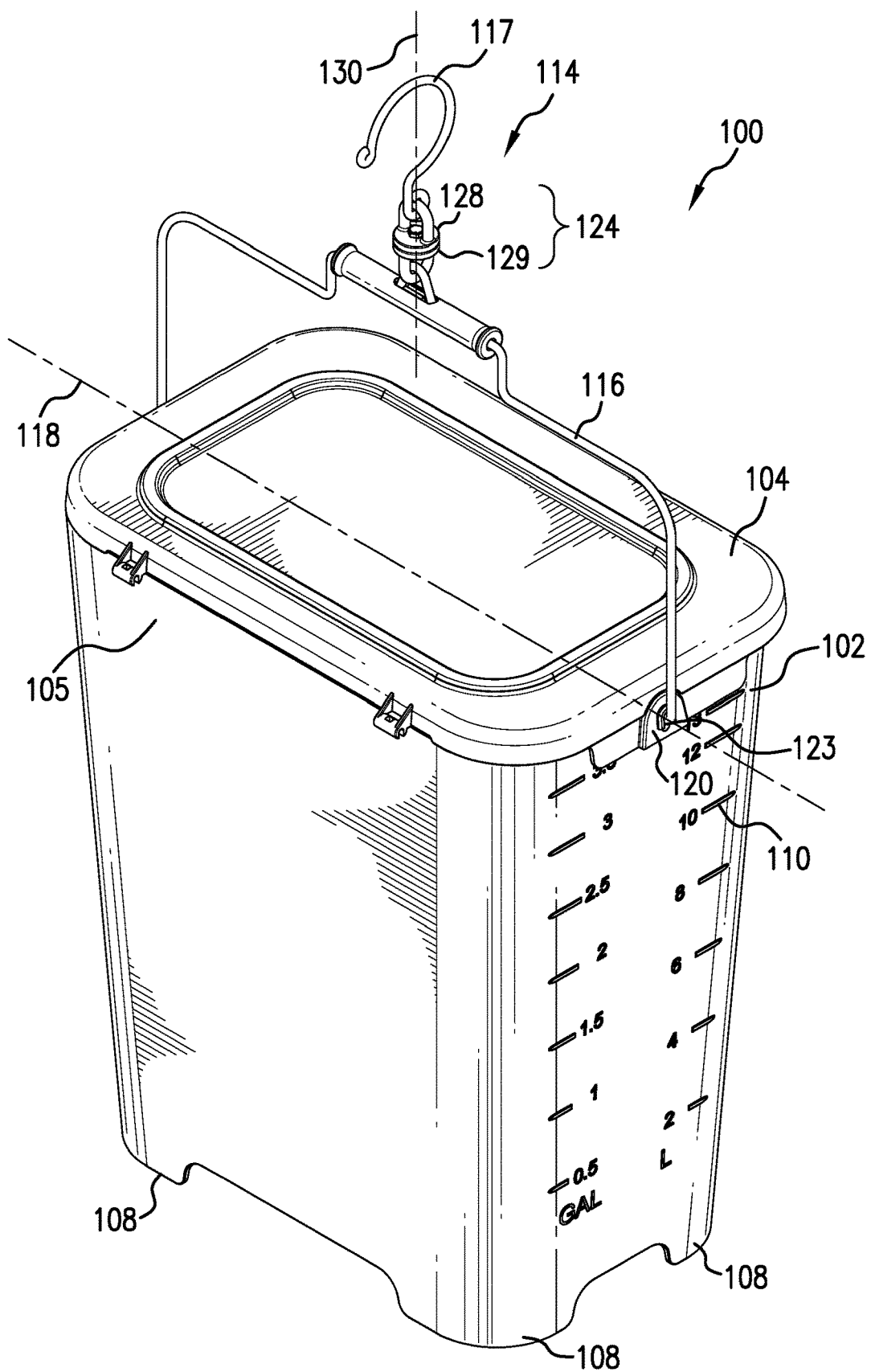
FIG. 1 is a perspective view of an animal drinker according to this disclosure.

FIGS. 1 through 5 show an animal drinker 100 according to a first implementation in this disclosure. Animal drinker 100 comprises of an enclosed container 102 for holding water, such as water, for providing hydration to poultry. Container 102 further has an opening at or near the top that can be selectively sealed with a lid 104 that is connected by a hinge 105 for filling container 102 with water. At least one hole is positioned near a bottom of container 102 that is plugged with a corresponding at least one valve 106 that can be activated by the poultry for hydration. One or more legs 108 near a bottom of container 102 keep valve 106 of the ground when animal drinker 100 is set on the ground.

Figure 2:
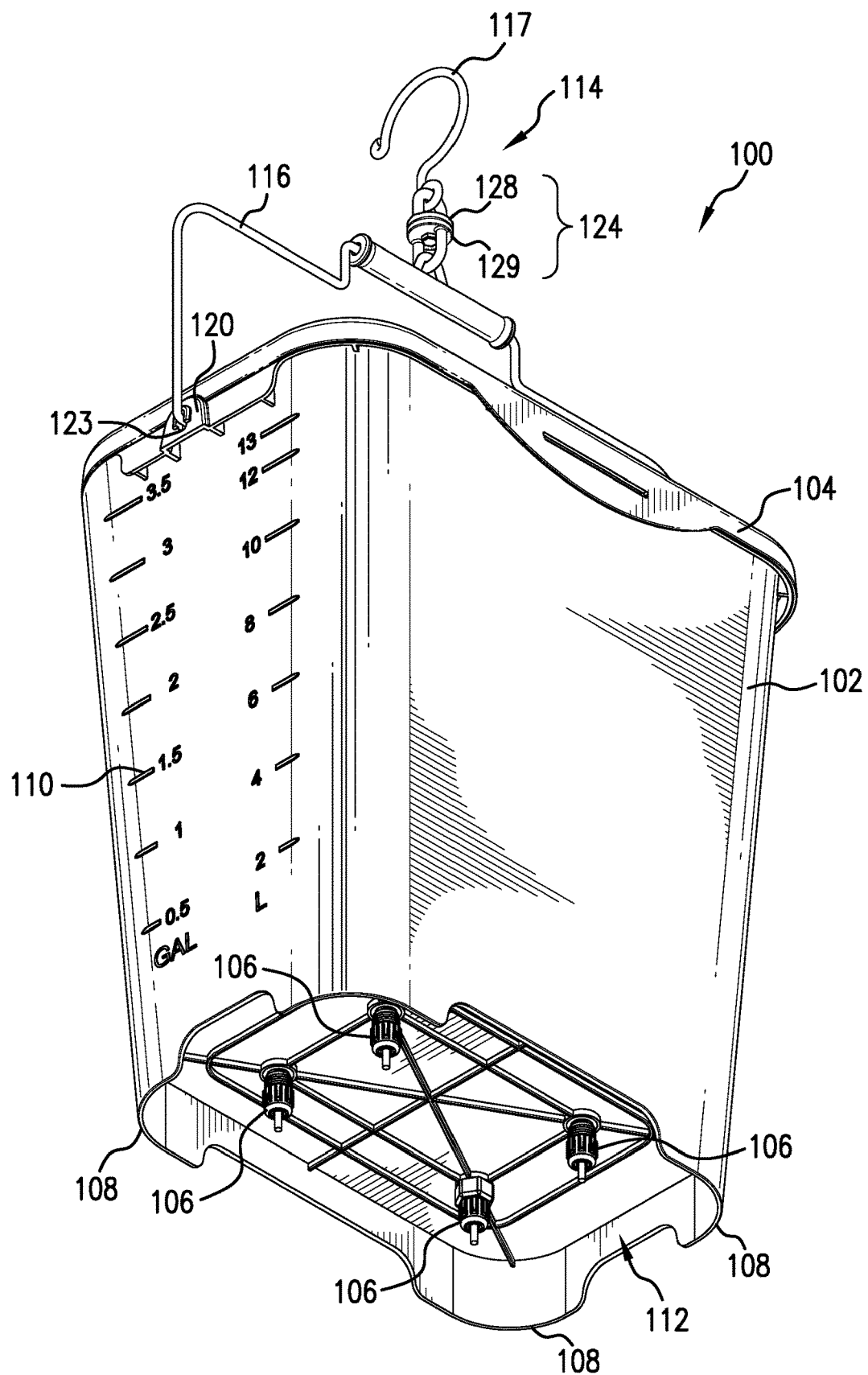
FIG. 2 is a bottom-side perspective view of the animal drinker of FIG. 1.
Figure 3:
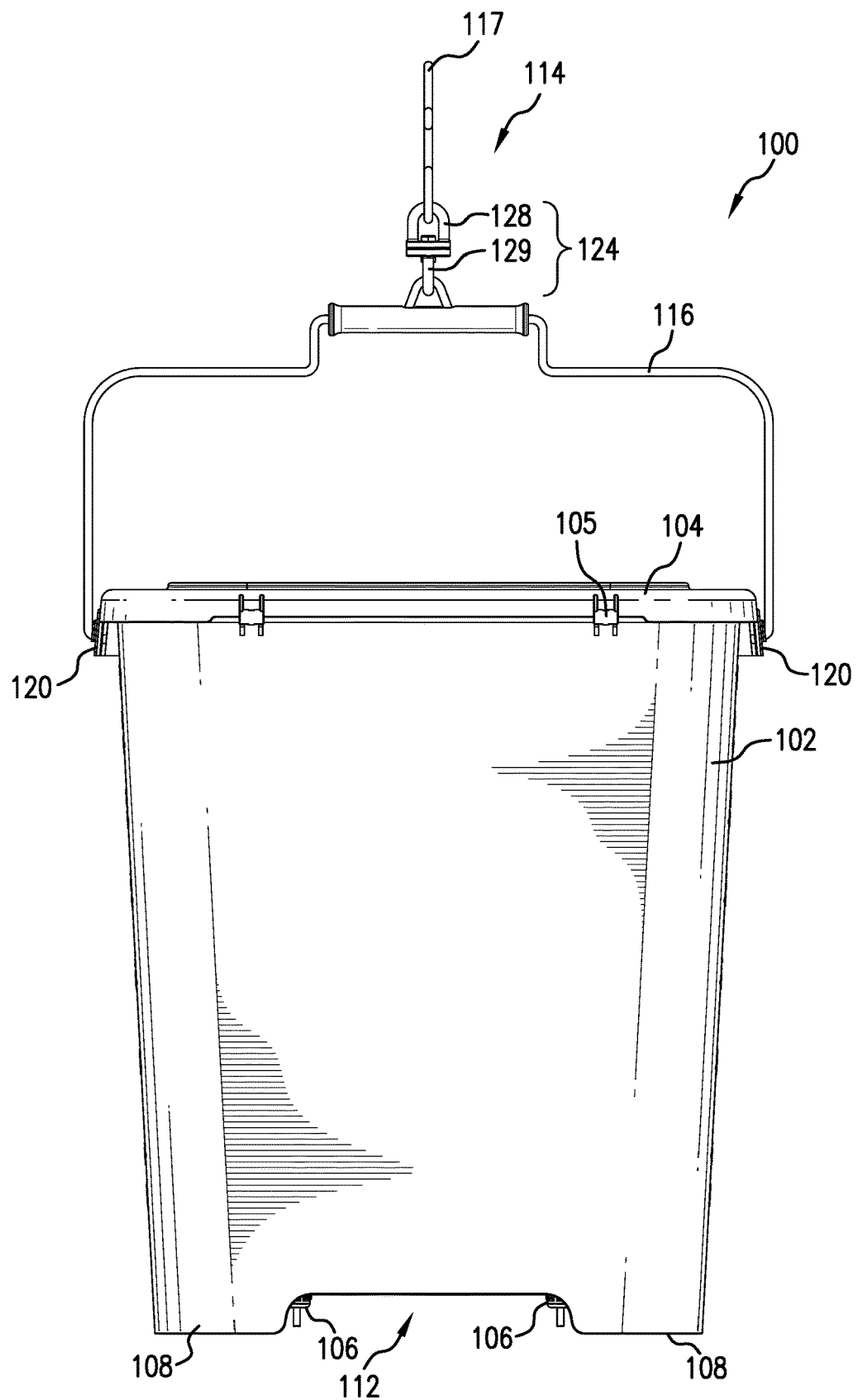
FIG. 3 is a front-side view of the animal drinker of FIG. 1.
Figure 4:
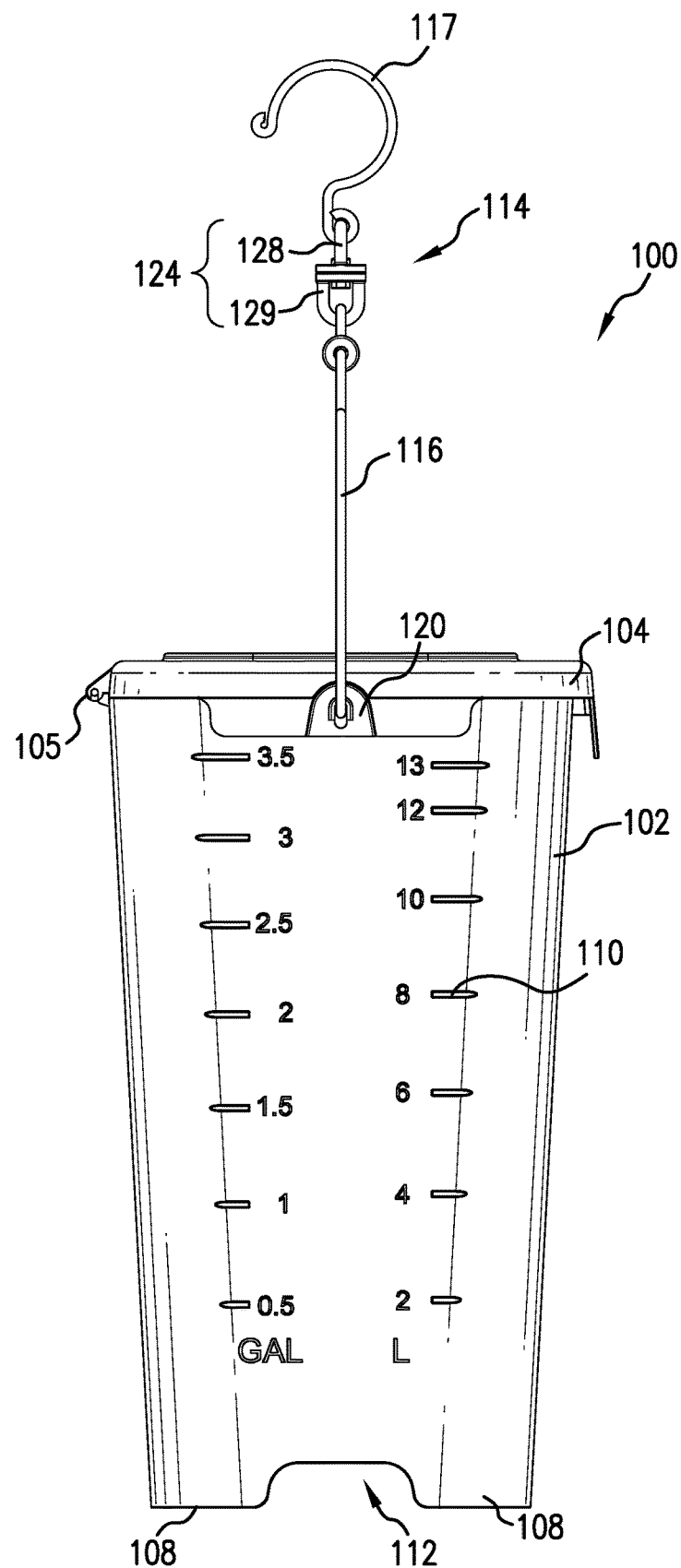
FIG. 4 is a side-view of the animal drinker of FIG. 1.
Figure 5:
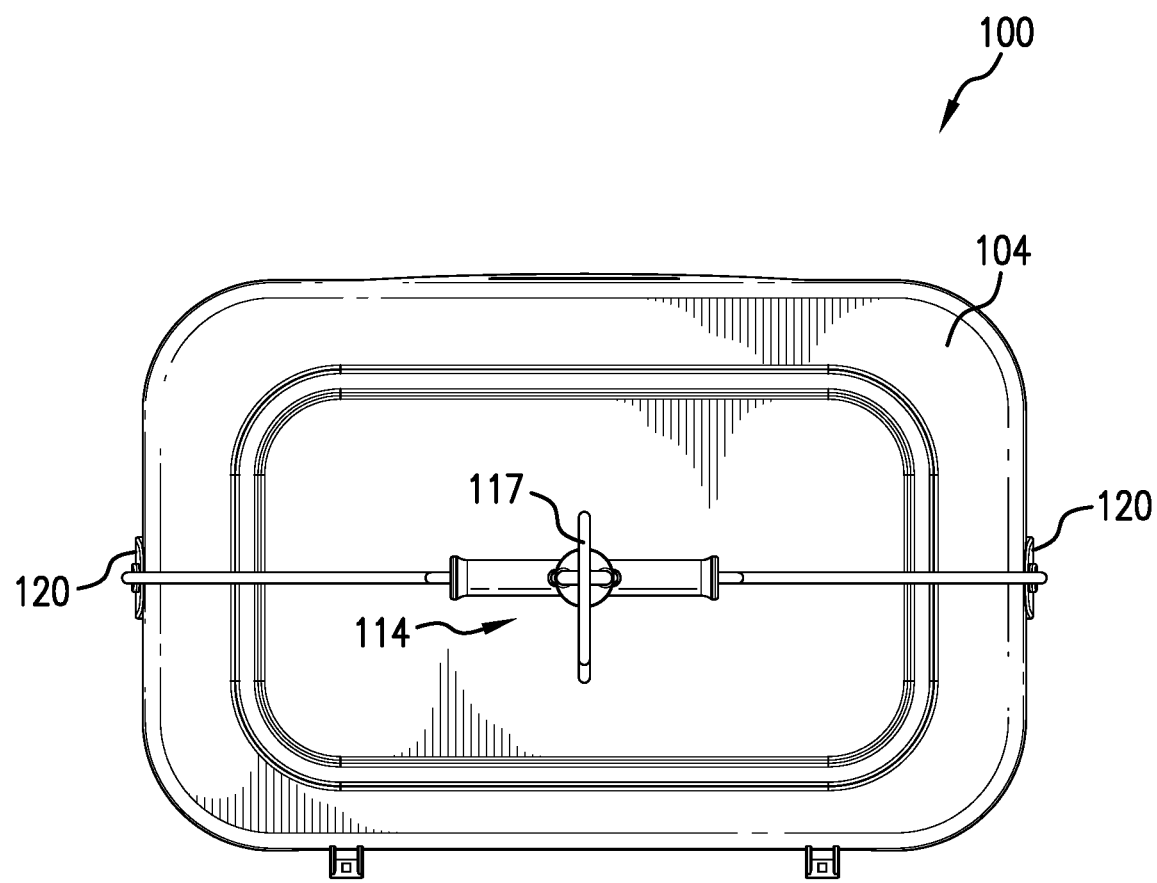
FIG. 5 is a top-view of the animal drinker of FIG. 1.
Figure 6:
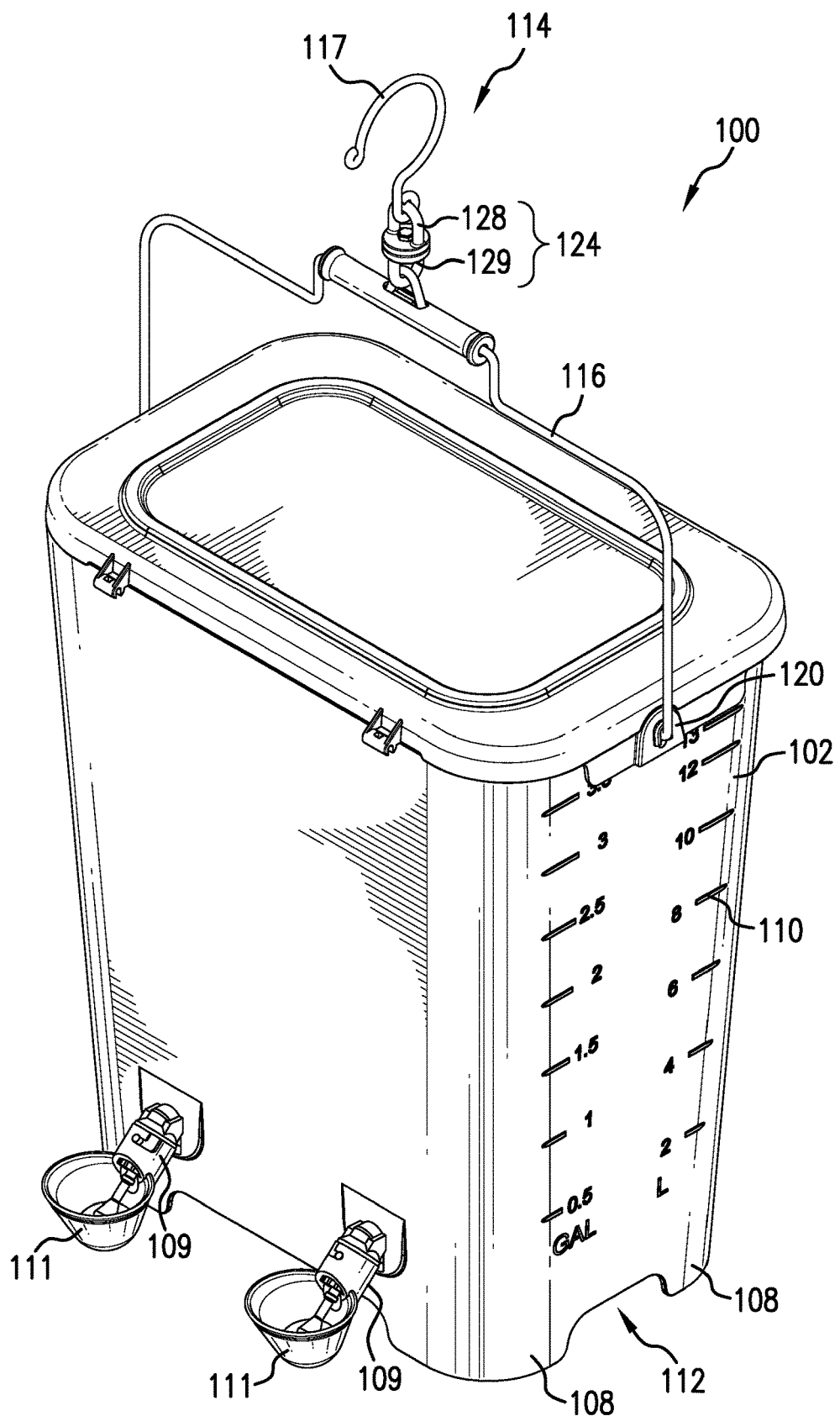
FIG. 6 is a perspective view of another implementation of an animal drinker according to this disclosure.
Figure 7:
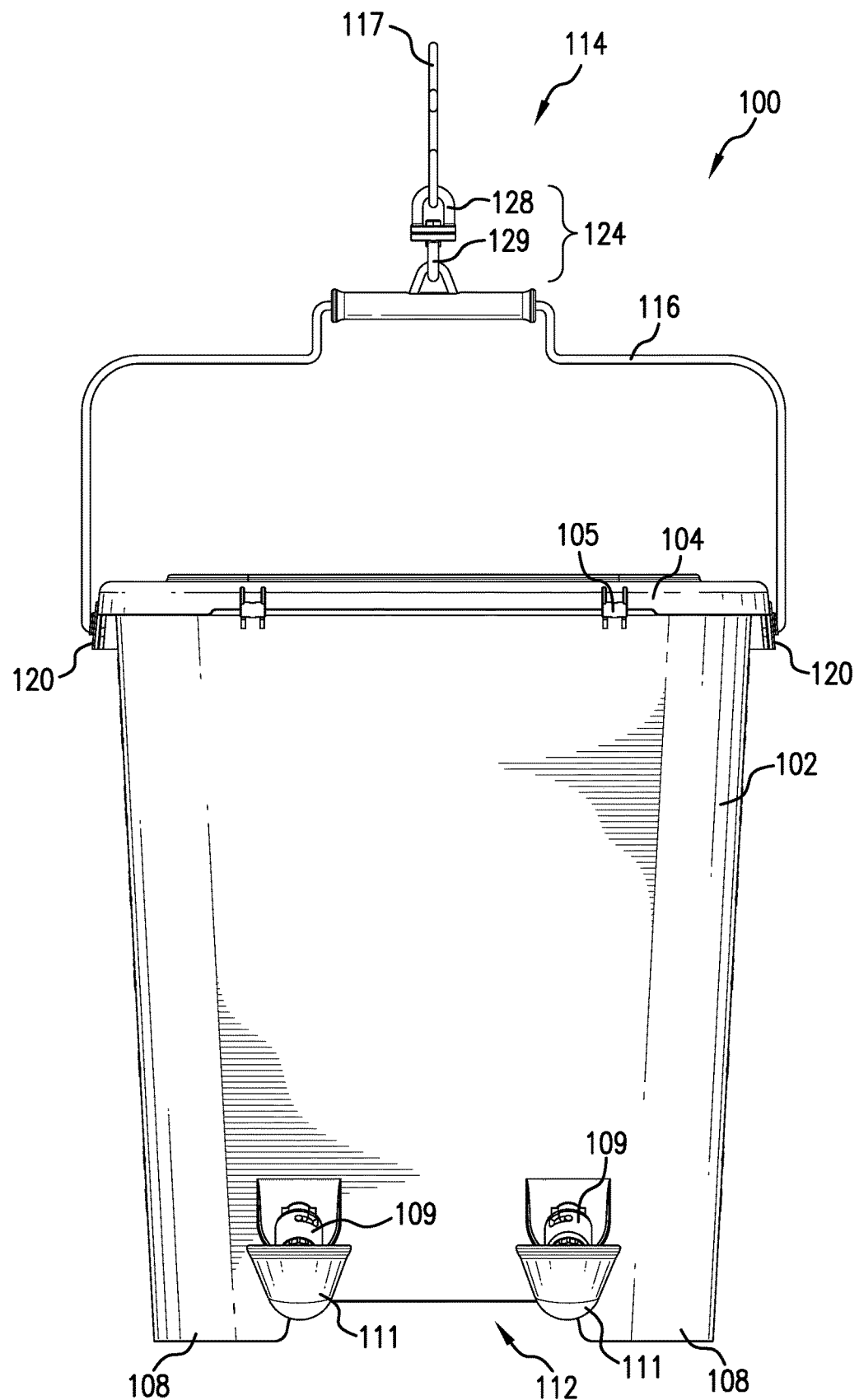
FIG. 7 is a front-side view of the animal drinker of FIG. 6.
Figure 8:
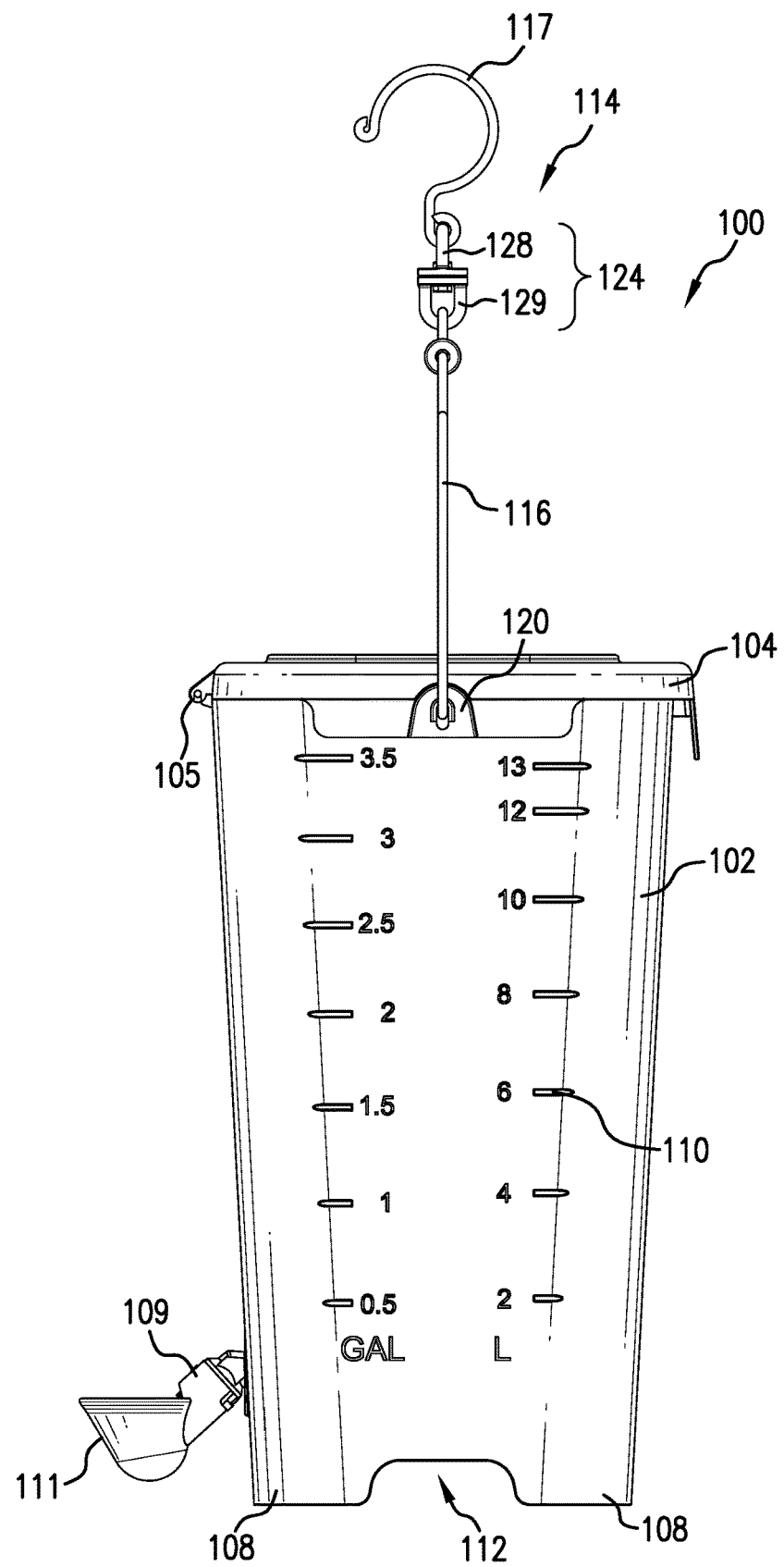
FIG. 8 is a side-view of the animal drinker of FIG. 6.
Figure 9:
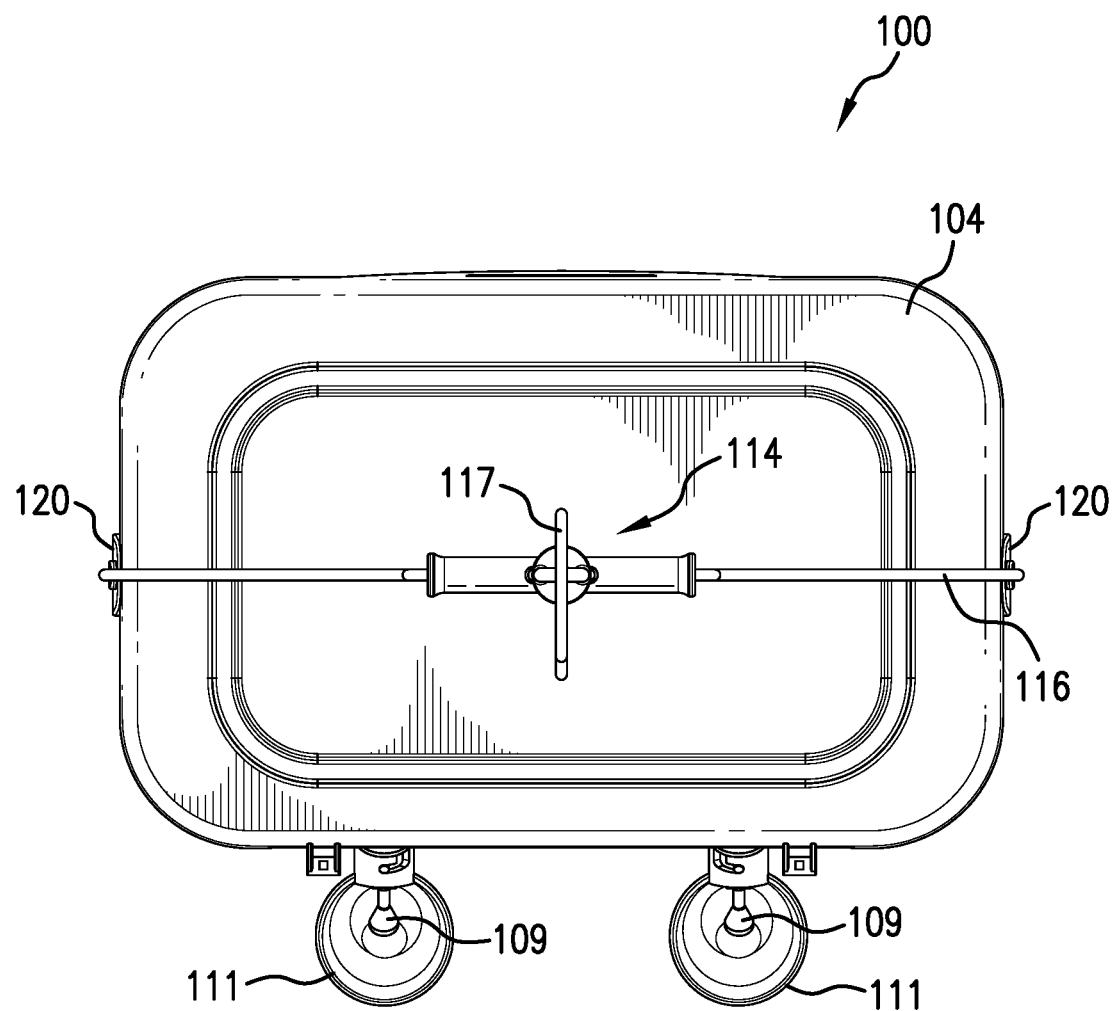
FIG. 9 is a top-view of the animal drinker of FIG. 6.

Turning to FIGS. 2 and 3, container 102 is illustrated with a generally rectangular cross-section with four sides. Each of the four sides can be tapered from the top of container 102 to the bottom of container 102 with a dimension of the top of container 102 being larger than a dimension of the bottom of container 102. The benefit of the tapered sides will be more apparent when discussed more fully below. Container 102 can be made of any material. In one implementation, container 102 is made from molded plastic with a translucent blue coloration to inhibit algae growth. While the drawings show a generally rectangular container 102, container 102 can have any cross-sectional shape, including square, circular, oval, polygonal, etc. On at least one side of container 102 are gradation marks 110 to show the volume of water in container 102. The drawings show gradation marks 110 in half-gallon increments, but any volume can be implemented.

As previously stated, container 102 has one or more legs 108 near the bottom of container 102 keep valve(s) 106 of the ground when animal drinker 100 is set on the ground. Leg(s) 108 can be molded into container 102 positioned on opposite corners or each corner of container 102. Four legs 108 are shown in the drawings, although more or less including one continuous leg 108 around the bottom of container 102 could also be provided. As shown in FIG. 2, an open area 112 between leg(s) 108 and the bottom of container 102 is formed. Open area 112 has sufficient depth to receive valve 106 so that it remains positioned off of the ground. This keeps valve 106 out of any dirt, debris, feces, etc. that may be on the ground. This allows the farmer to safely set animal drinker 100 on the ground while he is refilling it without contaminating valve 106.

Container 102 has a hole in the bottom of container 102 for receiving a corresponding valve 106. Valve 106 can be secured in the hole and seal the hole in a number of manners. The drawings show a threaded valve inserted in the hole. A nut is threaded onto the threaded portion from inside the container with one or more o-rings to seal the hole. Animal drinker 100 is a gravity flow container. Valve 106 can be easily activated by the poultry to obtain access to the fresh water inside container 102.

In another implementation, shown in FIGS. 6-10, comprises valve(s) 109 on a side of container 102 with drinking cups 111 connected thereto. This implementation works by gravity flow in a substantially similar way. Valves 109 are positioned near the bottom of container 102 so that water in container 102 is forced by gravity out valves 109. Valves 109 can meter water flow into drinking cups 111 so that the poultry can drink therefrom. In much the same way, valves 109 are positioned in such a manner to keep them off of the ground when animal drinker 100 is set on the ground.

Figure 10:
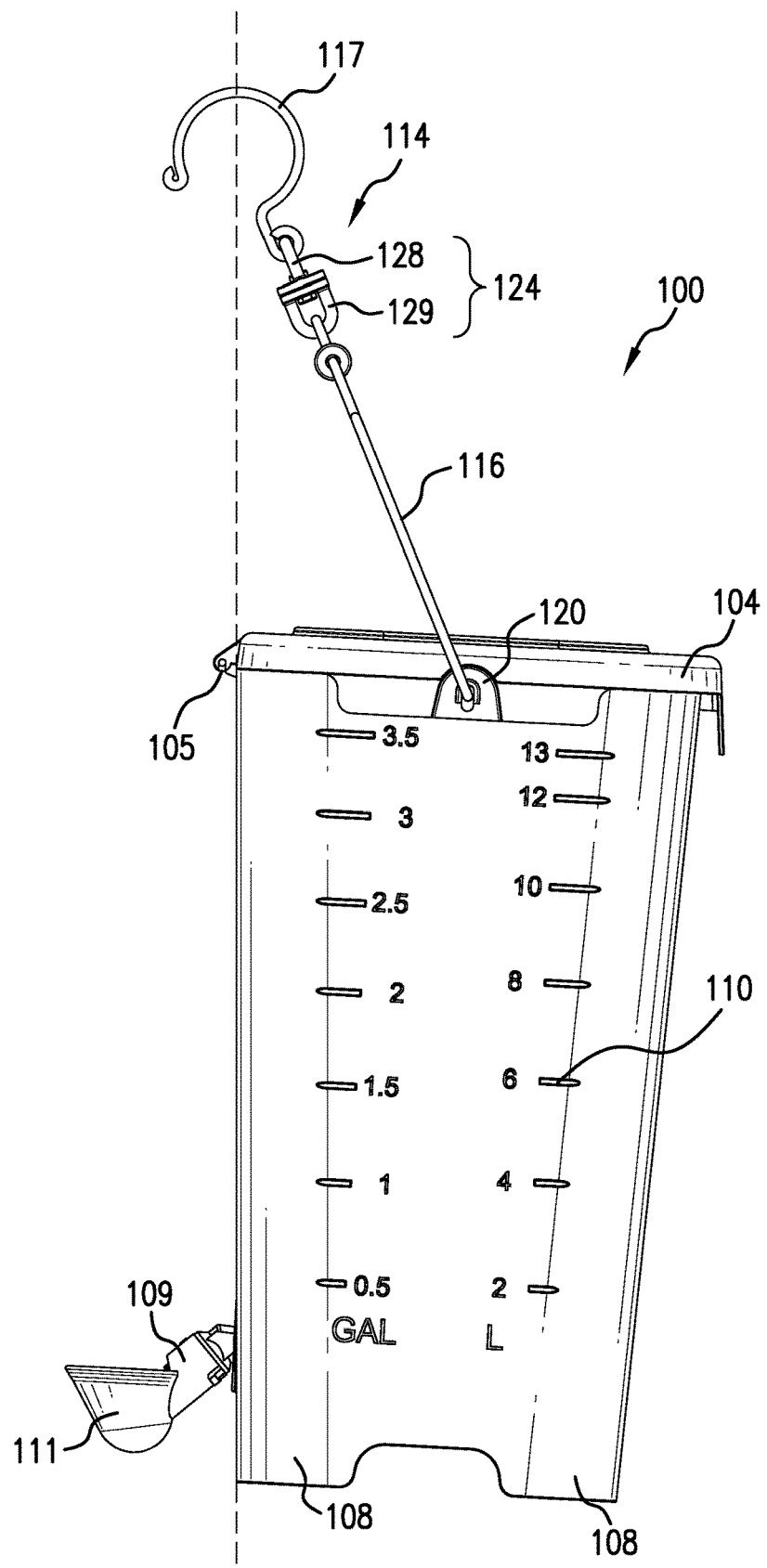
FIG. 10 is a perspective view of the animal drinker of FIG. 6.

Animal drinker 100 further comprises of a hanger assembly 114. Hanger assembly 114 comprises of a cross arm 116 that attaches to opposite sides near the top of container 102 and a hook 117 that is attached near a midpoint of cross arm 116, so that when animal drinker 100 is hung on an object, for example on a fence as shown in FIG. 10, container 102 rotates around a first axis 118 that extends between cross arm 116, so that the front side between the opposite sides of container 102 rests substantially flush against the fence. This arrangement keeps animal drinker 100 relatively stable against the object even though it is suspended. Moreover, in the implementation shown in FIGS. 6-10, animal drinker 100 can be hung on a fence outside the enclosed area with valves 109 and drinking cups 111 extending through the fence. This keeps container 102 outside the enclosed area of the fence so that it can be easily refilled without having to go inside the enclosed area yet still provide hydration to the poultry.

More specifically, hanger assembly 114 is combined to container 102 by a tab 120 on opposite sides of container 102 near the top of container 102. Hanger assembly 114 comprises of a cross arm 116 with a projection 123 on opposite sides thereof to engage the corresponding hole in tab 120 on each side of container 102. This arrangement allows cross arm 116 and container 102 to rotate with respect to each other. In this regard, a first axis 126 extends between the cross arm so that a front side of container 102 can rest substantially flush against the fence, as shown in FIG. 10.

Hanger assembly 114 further comprises of a rotatable connector 124 comprising a bottom portion 127 combined to cross arm 116 and a top portion 128 combined to hook 117. Bottom portion 127 rotates with respect to top portion 128 around a second axis 130 extending there between that is perpendicular to first axis 126.

What is claimed is:

1. An animal drinker comprising:
   an enclosed container for holding water with an opening at a top of the container for filling the container with the water and at least one hole in a bottom surface of the container;
   at least one leg underneath the container for supporting the bottom of the container off of a ground; and
   at least one valve positioned in the at least one hole for an animal to obtain water from the container, wherein the at least one leg is positioned outward of the at least one valve on the bottom surface of the container, and wherein the at least one leg extends downward from the bottom surface to at least partially circumscribe the at least one valve such that the at least one leg limits exposure of the at least one valve to debris on the ground, and wherein the at least one valve is inaccessible to the animal when the at least one leg is positioned on the ground.

2. The animal drinker of claim 1, wherein the enclosed container is tapered from a top of the container to the bottom of the container, wherein a dimension of the top of the container is larger than a dimension of the bottom of the container.

3. The animal drinker of claim 1, wherein the at least one leg comprises four legs underneath the container for supporting the bottom surface of the container off of the ground.

4. The animal drinker of claim 3, wherein each leg of the four legs are molded to the container and positioned on a respective corner of the container.

5. The animal drinker of claim 1, wherein the at least one leg positions the valve above the ground surface so that the animal drinker can be set on the ground without the valve touching the ground surface.

6. The animal drinker of claim 1, wherein the animal drinker provides a gravity flow.

7. The animal drinker of claim 1, wherein the at least one valve is positioned in the bottom surface of the container for the animal to drink from the bottom of the container.

8. The animal drinker of claim 1, and further comprising a lid to cover the top of the container.

9. The animal drinker of claim 1, and further comprising a hook for hanging the container.

10. The animal drinker of claim 9, and further comprising a hanger assembly comprising a cross arm that attaches to opposite sides of the container near the top of the container and the hook is attached near a midpoint of the cross arm so that when the animal drinker is hung the container rotates around a first axis extending between the cross arm so that a front side of the container between the opposite sides of the container rests substantially flush against an object, such as a fence.

11. The animal drinker of claim 10, and further comprising a pair of tabs that each include a hole, the pair of tabs positioned on opposite sides of the container near the top of the container, wherein the cross arm comprises a pair of projections on opposite ends thereof to engage the corresponding hole the tab on each side of the container, wherein the cross arm and the container can rotate with respect to each other.

12. The animal drinker of claim 11, wherein the hanger assembly further comprises a rotatable connector comprising a bottom portion combined to the cross arm and a top portion combined to the hook, wherein the bottom portion rotates with respect to the top portion around a second axis that is perpendicular to the first axis.

13. The animal drinker of claim 1, wherein the at least one valve extends from the bottom surface of the container, and wherein the at least one leg is positioned about at least a portion of the periphery of the bottom surface of the container.

14. The animal drinker of claim 1, wherein the at least one valve extends from the bottom surface of the container, and wherein the at least one leg extends from at least one side surface of the container.

15. The animal drinker of claim 14, wherein the at least one leg extends continuously downward from at least one side surface of the container.

16. An animal drinker comprising:
   an enclosed container for holding water with an opening at a top of the container for filling the container with the water and at least one hole in a bottom of the container;
   at least one leg underneath the container for supporting the bottom of the container off of a ground, wherein the at least one leg is positioned at a corner of the container; and
   at least one valve positioned in the at least one hole for an animal to obtain water from the container, wherein the at least one leg is positioned outward of the at least one valve on the bottom surface of the container, and wherein the at least one valve is inaccessible to the animal when the legs are positioned on the ground.

17. An animal drinker comprising:

an enclosed container for holding water with an opening at a top of the container for filling the container with the water and at least one hole in a bottom surface of the container;

at least one leg underneath the container for supporting the bottom surface of the container off of a ground, wherein the at least one leg is positioned about at least a portion of the periphery of the bottom surface of the container; and at least one valve positioned in the at least one hole and extends from the bottom surface of the container for an animal to obtain water from the container, wherein the at least one leg is positioned outward of the at least one valve, and wherein the at least one leg extends downward from the bottom surface to at least partially circumscribe the at least one valve such that the at least one valve is inaccessible to an animal when the legs are positioned on the ground.

18. An animal drinker comprising:

an enclosed container for holding water with an opening at a top of the container for filling the container with the water and at least one hole in a bottom surface of the container;

a plurality of legs underneath the container for supporting the bottom of the container off of a ground, wherein each leg of the plurality of legs are molded to the container and positioned on a respective corner of the container; and at least one valve positioned in the at least one hole for an animal to obtain water from the container, wherein the plurality of legs are positioned outward of the at least one valve on the bottom surface of the container, and wherein the plurality of legs extend downward from the bottom surface to at least partially circumscribe the at least one valve such that the plurality of legs limit exposure of the at least one valve to debris on the ground.

19. An animal drinker comprising:

an enclosed container for holding water with an opening at a top of the container for filling the container with the water and at least one hole in a bottom surface of the container;

at least one leg underneath the container for supporting the bottom of the container off of a ground;

at least one valve positioned in the at least one hole for an animal to obtain water from the container, wherein the at least one leg is positioned outward of the at least one valve on the bottom surface of the container, and wherein the at least one leg extends downward from the bottom surface to at least partially circumscribe the at least one valve such that the at least one leg limits exposure of the at least one valve to debris on the ground;

a hook for hanging the container; and a hanger assembly comprising a cross arm that attaches to opposite sides of the container near the top of the container and the hook is attached near a midpoint of the cross arm so that when the animal drinker is hung the container rotates around a first axis extending between the cross arm so that a front side of the container between the opposite sides of the container rests substantially flush against an object.

\* \* \* \* \*